Oct. 2, 1956  C. F. FALKENBERG  2,764,893
AUTOMOBILE WASHING DEVICE, INCLUDING TRAVELING CARRIAGE
Filed March 14, 1955
2 Sheets-Sheet 1
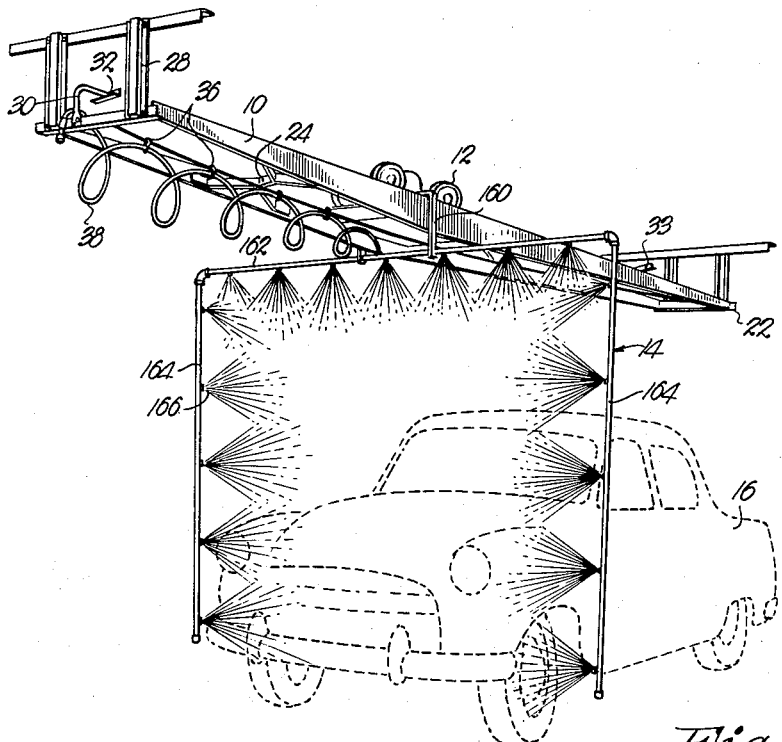
Fig. 1.
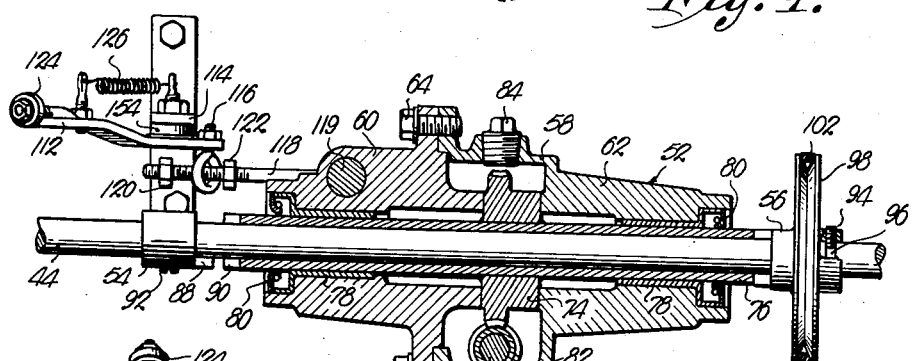
Fig. 6.
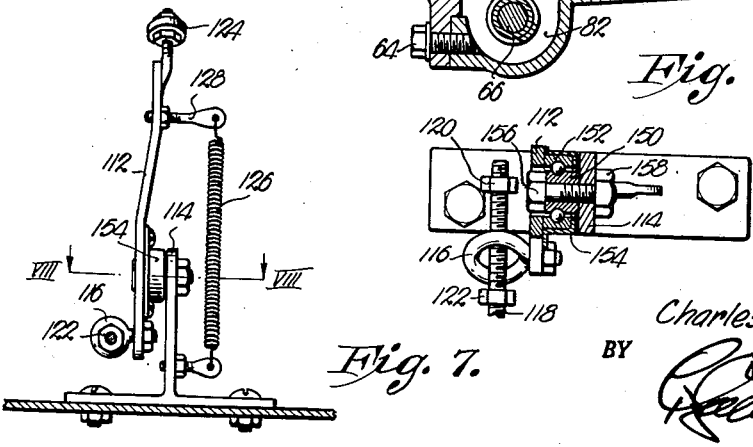
Fig. 7.
Fig. 8.
INVENTOR.
Charles F. Falkenberg
BY
ATTORNEY.

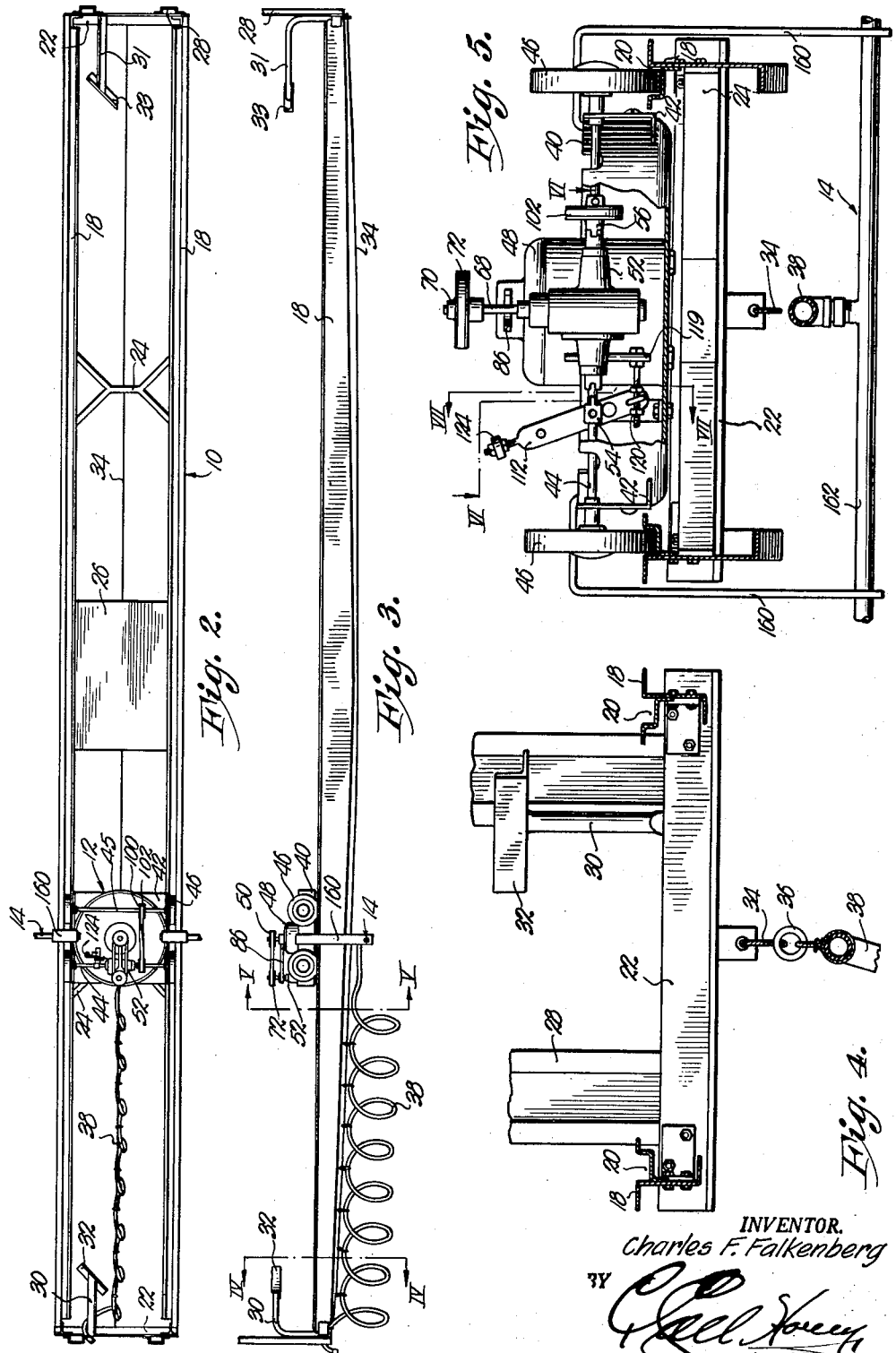

United States Patent Office 2,764,893
Patented Oct. 2, 1956

2,764,893

AUTOMOBILE WASHING DEVICE, INCLUDING TRAVELING CARRIAGE

Charles F. Falkenberg, Kansas City, Mo.

Application March 14, 1955, Serial No. 494,120

2 Claims. (Cl. 74—25)

This invention relates to the care and maintenance of automobiles and, more particularly, to overhead traveling spray apparatus for supplying the water or other liquid cleanser used in washing automobiles and the like.

The most important object of the present invention is to provide a carriage which travels on an overhead track and from which depends a spray head for distributing a liquid cleanser on equipment located therebeneath.

A further important object of the present invention is the provision of a traveling carriage having a prime mover and provided with a transmission assembly coupled with the prime mover and shiftable on the carriage to reverse the direction of movement thereof.

Another important object of the present invention is to provide a shift lever on the carriage and connected with the transmission assembly for shifting the latter, the shift lever being engageable with specially provided shoes at each end of the overhead track for reversing automatically the direction of movement of the carriage.

A yet further object of the present invention is the provision of means for mounting the shift lever, including a spring for urging the lever toward an off-center position, which mounting means insures positive shifting of the lever and the transmission assembly each time the lever engages a shoe.

Other objectives include the provision of spaced stops on the transmission assembly one of which is engaged by the lever to shift the assembly only after the lever has been swung beyond a center position; the provision of a spring of sufficient strength and resilience to swing the lever positively from the center position into engagement with a stop and to thereupon swing the lever further and shift the transmission assembly; the provision of clutch elements engageable by the transmission assembly as the latter is shifted which elements are coupled with the carriage for driving the same in opposite directions; and other, more minor objectives which will become apparent in the specification which follows and from a study of the appended drawing wherein:

Figure 1 is a perspective view of the washing apparatus of the present invention.

Fig. 2 is a fragmentary, top, plan view of the apparatus shown in Fig. 1.

Fig. 3 is a fragmentary, side elevational view of the apparatus of Figs. 1 and 2.

Fig. 4 is an enlarged, transverse, cross-sectional view taken on line IV—IV of Fig. 3 and illustrating the details of construction of the suspended track shown therein.

Fig. 5 is an enlarged, transverse, cross-sectional view taken on line V—V of Fig. 3, parts being broken away to reveal details of the drive structure for the traveling carriage of Figs. 1–3.

Fig. 6 is a further enlarged, cross-sectional view taken on irregular line VI—VI of Fig. 5.

Fig. 7 is a further enlarged, cross-sectional view taken on line VII—VII of Fig. 5; and Fig. 8 is an enlarged, cross-sectional view taken on line VIII—VIII of Fig. 7.

Referring now to the drawings, wherein like numerals indicate similar parts, the washing apparatus therein illustrated comprises generally a suspended track 10, a traveling carriage 12 and a spray head 14 depending from the carriage 12 for movement therewith along the track 10 above an automobile 16.

The track 10 includes a pair of rails 18, each of which has a channel 20 formed therein. The rails 18 are interconnected and held in spaced-apart parallelism by structural members 22 at each end thereof and by intermediate braces 24. The rails are further interconnected by a central pan 26 above which the carriage 12 may be stopped when not in use. At each end thereof, the track 10 is provided with a hanger 28 by means of which the entire washing apparatus may be suspended above a wash floor. The end members 22 are provided with L-shaped pipes 30 and 31, respectively, which are attached thereto adjacent one of the rails 18 and provided at the outermost ends thereof above the track 10 with angularly disposed shoes 32 and 33, respectively, the purpose of which will be explained more fully hereinafter.

Between the rails 18 and beneath the braces 24 there is a length of cable 34 which interconnects the end members 22. As best shown in Figs. 3 and 4, the cable 34 slidably carries a plurality of rings 36 each of which is fastened at spaced intervals to a coiled hose 38 so that the latter may be extended to its full length as the carriage 12 travels toward the shoe 33. As is best shown in Fig. 5, hose 38 is coupled with spray head 14 for delivery thereto of a liquid cleanser such as water or a solution of soap and water when the apparatus is in operation.

The carriage 12 includes, as elements thereof, an inverted, pan-shaped body 40 having a pair of opposed brackets 42 attached thereto. The brackets 42 are transversely L-shaped and rotatably receive a pair of spaced axles 44 and 45, each of which carries a pair of wheels 46 for rotation therewith. Viewing Figs. 2 and 5, it is seen that the wheels 46 roll in the channels 20 of rails 18.

Within the body 40 and between the axles 44 and 45, there is mounted a prime mover 48 which may be coupled with a suitable source of electrical power to cause rotation of a pulley 50 forming a part of prime mover 48.

The drive structure for transmitting the rotation of pulley 50 to the axles 44 and 45 includes a transmission assembly designated broadly by the numeral 52, which assembly 52 is both shiftable and rotatable on the axle 44 between a pair of spaced clutch elements 54 and 56. As is illustrated in Fig. 6, the assembly 52 has a gear box 58 made up of sections 60 and 62 which are interconnected by fasteners 64. Within gear box 58, a worm gear 66 is mounted for rotation and includes a shaft 68 extending outwardly from box 58. Shaft 68 carries, at its outermost end, a pulley 70 which is coupled with the pulley 50 on prime mover 48 by means of an endless belt 72. Worm gear 66 meshes with a pinion gear 74 which is rigidly mounted on a tubular sleeve 76 between opposed portions of sections 60 and 62. Sleeve 76 projects outwardly from gear box 58 at each end of the latter and is rotatably mounted in opposed bearings 78, each of which is provided with a sealing ring 80 for preventing escape of lubricating oil from a sump 82 within gear box 58. Section 62 of gear box 58 is provided with a threaded opening for receiving a plug 84 which may be removed to permit access to the sump 82. The belt 72 is maintained in a taut condition on pulleys 50 and 70, at times when neither clutch element 54 or 56 is engaged, by the engagement of shaft 68 with a bifurcated spacer element 86 between the arms thereof. The element 86 projects outwardly from prime mover 48. The arms of element 86 are spaced sufficiently to permit shifting of assembly 52 between clutch elements 54 and 56.

Each of the clutch elements 54 and 56 has a single dog 88 which is adapted for interlocking engagement with the sleeve 76. To this end, sleeve 76 is provided at each end with a plurality of teeth 90 and the dogs 88 are adapted to engage sleeve 76 between an adjacent pair of teeth 90 each time assembly 52 is shifted on axle 44. The clutch element 54 is rigidly attached to the axle 44 by a setscrew 92 and thereby couples the axle 44 with the prime mover 48 when interlocked with the sleeve 76. The clutch element 56 is keyed to the axle 44 by means of a setscrew 94 which extends into a peripheral slot 96 on axle 44. Clutch element 56 is therefore freely rotatable on axle 44 and carries a pulley 98 so that, when the sleeve 76 is coupled with the clutch element 56, pulley 98 is coupled with prime mover 48 for rotation relative to axle 44. The axle 45 rigidly carries a pulley 100 which is coupled with the pulley 98 by means of a twisted, endless belt 102 so that the direction of rotation imparted to the axle 45 is opposite to the direction of rotation of the axle 44 when clutch element 54 is driven.

The transmission assembly 52 is shifted on axle 44 between clutch elements 54 and 56 by means of a shift lever 112 in a manner best illustrated in Figs. 6–8. The elongated lever 112 is pivotally mounted intermediate its ends to an upstanding plate 114 which is itself integrally attached to the body 40 closely adjacent axle 44. At its lowermost end, lever 112 carries an eyelet 116 which receives a bolt 118. The bolt 118 is attached integrally with a stud 119 on the section 60 of gear box 58 and projects outwardly therefrom in substantial parallelism with the sleeve 76. The bolt 118 has a pair of adjustable stops 120 and 122 thereon adjacent its outermost end which are alternately engaged by the eyelet 116. At its uppermost end, lever 112 is provided with a roller 124 which is engageable with shoes 32 and 33 as the carriage 12 travels on track 10. The angular disposition of the shoes 32 and 33 is such as to cause shifting of the lever 112 at each end of the path of travel of the carriage 12.

An elongated coil spring 126 is attached at one end thereof to the plate 114 and at its opposite end to a projection 128 adjacent the uppermost end of lever 112. It is noted that the spring 126 is attached to the plate 114 directly beneath the pivotal attachment for lever 112 and is therefore in alignment with the lever 112 and in maximum tension when the lever 112 is substantially vertical and in a center position between the opposed ends of its swinging path of travel.

The means for pivotally attaching the lever 112 to the plate 114 comprises a ball bearing having an inner race 150 and an outer race 152, a cap 154, a bolt 156 and a nut 158. Cap 154 has a central opening therein receiving the bolt 156 and inner race 150. The cap 154 is fastened integrally to the lever 112 and serves to hold the outer race 152 rigidly attached to the lever 112. The bolt and nut 156—158 pass through the inner race 150 and fasten the latter rigidly to the plate 114. Thus the inner race 150 is at all times stationary and the outer race 152 is attached to the lever 112 for rotation therewith to present a substantially frictionless, pivotal mounting for the lever 112.

At each side thereof, the body 40 is provided with a hanger which projects outwardly from the body above a rail 18 and downwardly therefrom to a position below the track 10. At the lowermost ends thereof, the hangers 160 receive the bight 162 of U-shaped spray head 14 which is provided additionally with a pair of depending legs 164. Throughout the lengths thereof, the bight 162 and the legs 164 of spray head 14 are provided with spray nozzles 166 which are so spaced as to distribute a liquid cleanser over all parts of the automobile 16 as the carriage 12 travels along track 10.

In operation, prime mover 48 is energized to drive carriage 12 and a valve (not shown) is opened to supply the hose 38 with a pressurized, liquid cleanser. As the carriage 12 moves to the left, viewing Fig. 2, the roller 124 on lever 112 engages shoe 32 and is swung toward the opposite end of its swinging path of travel. As the lever 112 is swung, the eyelet 116 moves on bolt 118 and engages stop 120 as the lever 112 swings past its center position. The spring 126, being again off-center, is sufficiently strong to guarantee continued swinging movement of the lever 112 and consequent shifting of the transmission assembly 52 by the engagement of eyelet 16 with the stop 120. When the carriage 12 has again traveled through the length of the rails 18, lever 112 will be swung to its initial position by the engagement of roller 124 with shoe 33 and the direction of movement of the carriage 12 reversed. Spring 126 serves also to maintain the sleeve 76 in engagement with a clutch element 54 or 56 as the carriage 12 travels between shoes 32 and 33.

It is obvious that the embodiment herein disclosed is a preferred form only and that many changes or modifications may be made therein without departing from the broad principles of the present invention. Such changes or modifications are contemplated hereby and it is, therefore, desired to be limited only by the scope of the appended claims.

Having thus described the invention what is claimed as new and desired to be secured by Letters Patent is:

1. In a carriage having a spaced pair of wheel and axle assemblies and a unidirectional prime mover, drive structure for alternately coupling the prime mover with the axles for rotating the latter in opposite directions, said structure comprising a pair of spaced clutch elements on one of said axles, one of said elements being rotatably mounted and the other of said elements being fixedly mounted on said one axle; a transmission assembly mounted on said one axle for shifting movement between the clutch elements, said transmission assembly being coupled with the prime mover and operably engageable with a different one of said clutch elements at each end of its path of travel; means coupling said one element with the second axle for rotating the latter in a direction opposite to the direction of rotation of said one element; and means on said carriage operably coupled with said transmission assembly for shifting the latter between the clutch elements.

2. In a carriage having a prime mover and at least one axle provided with a pair of spaced clutch eletments, a transmission assembly comprising a gear box having a number of gears mounted therein in meshing interengagement and coupled with the prime mover; an elongated, tubular sleeve rotatably mounted in said gear box and projecting outwardly therefrom at each end of the sleeve, the latter being telescoped on said axle for rotation thereon and for shifting movement between the clutch elements; and means coupling the sleeve with one of said gears for rotation therewith, said sleeve being engageable with a clutch element at each end of its path of travel for driving the engaged clutch element.

References Cited in the file of this patent

UNITED STATES PATENTS

| 1,414,430 | Mammen | May 2, 1922 |
| 1,504,084 | Spencer | Aug. 5, 1924 |
| 1,506,724 | Norton | Aug. 26, 1924 |
| 2,268,028 | Fairbairn | Dec. 30, 1941 |
| 2,703,579 | Meraney | Mar. 8, 1955 |

FOREIGN PATENTS

| 586,108 | Great Britain | Mar. 7, 1947 |